(12) United States Patent
Radhakrishnan et al.

(10) Patent No.: US 9,143,410 B1
(45) Date of Patent: Sep. 22, 2015

(54) TECHNIQUES FOR MONITORING GUEST DOMAINS CONFIGURED WITH ALTERNATE I/O DOMAINS

(75) Inventors: Sajith C. Radhakrishnan, Palakkad District (IN); Venkatareddy Chappavarapu, Visakhapatnam (IN)

(73) Assignee: Symantec Corporation, Mountain View, CA (US)

( * ) Notice: Subject to any disclaimer, the term of this patent is extended or adjusted under 35 U.S.C. 154(b) by 633 days.

(21) Appl. No.: 13/333,689

(22) Filed: Dec. 21, 2011

(51) Int. Cl.
G06F 15/177 (2006.01)
H04L 12/26 (2006.01)
G06F 11/30 (2006.01)
G06F 9/455 (2006.01)

(52) U.S. Cl.
CPC .............. *H04L 43/00* (2013.01); *G06F 11/301* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 7,386,708 B2 * | 6/2008 | Bantz et al. | 712/226 |
| 7,409,722 B2 * | 8/2008 | Smith | 726/27 |
| 7,797,707 B2 * | 9/2010 | Cherkasova et al. | 719/310 |
| 7,886,021 B2 * | 2/2011 | Scheifler et al. | 709/217 |
| 7,957,322 B2 * | 6/2011 | Reeves et al. | 370/254 |
| 7,979,869 B2 * | 7/2011 | Manczak et al. | 719/327 |
| 8,185,631 B2 * | 5/2012 | Fuente et al. | 709/226 |
| 8,255,475 B2 * | 8/2012 | Kagan et al. | 709/212 |
| 8,527,653 B2 * | 9/2013 | Maria | 709/232 |
| 2008/0298294 A1 * | 12/2008 | Gonsa et al. | 370/312 |
| 2008/0317217 A1 * | 12/2008 | Bernardini et al. | 379/32.03 |
| 2009/0089815 A1 * | 4/2009 | Manczak et al. | 719/327 |
| 2010/0100718 A1 * | 4/2010 | Srinivasan | 713/1 |
| 2010/0262803 A1 * | 10/2010 | Uchida et al. | 711/172 |
| 2011/0320574 A1 * | 12/2011 | Felts | 709/220 |
| 2012/0117266 A1 * | 5/2012 | Maria | 709/232 |
| 2012/0278430 A1 * | 11/2012 | Lehane et al. | 709/217 |

* cited by examiner

*Primary Examiner* — Ahn-Vu Ly
*Assistant Examiner* — Phyllis A Book
(74) *Attorney, Agent, or Firm* — Wilmer Cutler Pickering Hale and Dorr LLP

(57) ABSTRACT

Techniques for monitoring guest domains configured with alternate I/O domains are disclosed. In one particular exemplary embodiment, the techniques may be realized as a method for monitoring guest domains configured with alternate Input/Output (I/O) domains comprising, installing cluster services in a control domain, installing cluster services in one or more alternate I/O domains, configuring, using at least one computer processor, an alternate service group to monitor services from multiple I/O domains, and configuring a logical domain service group, wherein the logical domain service group manages a guest domain which receives I/O services from either the control domain or the at least one alternate I/O domain which are monitored via the alternate I/O service group.

19 Claims, 5 Drawing Sheets

TECHNIQUES FOR MONITORING GUEST DOMAINS CONFIGURED WITH ALTERNATE I/O DOMAINS

FIELD OF THE DISCLOSURE

The present disclosure relates generally to Input/Output (I/O) services monitoring and, more particularly, to techniques for monitoring guest domains configured with alternate I/O domains.

BACKGROUND OF THE DISCLOSURE

Server virtualization and partitioning services may provide logical domains (LDoms). Each domain may be a full virtual machine with a reconfigurable set of hardware resources. Operating systems running inside of logical domains may be stopped, started, and rebooted independently. High availability clustering services may also be available for server virtualization products, which may provide failover ability for applications allowing applications to migrate systems or nodes in the event of a problem with a first system or node.

Server virtualization products may provide alternate I/O domains to provide I/O redundancy. However, high availability clustering services monitor I/O services only from a primary I/O domain and are not able to identify the state of the storage or network services provided through an alternate (secondary) I/O domain. The lack of monitoring may lead to unnecessary downtime for applications with alternate I/O domain configured. Additionally, high availability clustering may unnecessarily attempt to migrate the virtual machines from node or system due to a lack of awareness of an alternate I/O domain.

In view of the foregoing, it may be understood that there may be significant problems and shortcomings associated with current techniques for monitoring virtual machines (guest domains) configured with alternate I/O domains.

SUMMARY OF THE DISCLOSURE

Techniques for monitoring guest domains configured with alternate I/O domains are disclosed. In one particular exemplary embodiment, the techniques may be realized as a method for monitoring guest domains configured with alternate Input/Output (I/O) domains comprising, installing cluster services in a control domain, installing cluster services in one or more alternate I/O domains, configuring, using at least one computer processor, an alternate service group to monitor services from multiple I/O domains, and configuring a logical domain service group, wherein the logical domain service group manages a guest domain which receives I/O services from either the control domain or the at least one alternate I/O domain which are monitored via the alternate I/O service group.

In accordance with other aspects of this particular exemplary embodiment, configuring storage service groups may comprise configuring a first storage service group in the control domain and the alternate I/O domain on first system and configuring a second storage service group in the control domain and the alternate I/O domain on second system.

In accordance with further aspects of this particular exemplary embodiment, configuring network service groups may comprise configuring a first network service group in the control domain and the alternate I/O domain on first system and a second network service group in the control domain and the alternate I/O domain on second system.

In accordance with additional aspects of this particular exemplary embodiment, the storage service groups may be configured as parallel type service groups in the event storage services are simultaneously accessible to all nodes in a cluster.

In accordance with additional aspects of this particular exemplary embodiment, the parallel types service groups may support at least one of: shared LUNs, shared Disks, and a Cluster Volume Manager (CVM) volume.

In accordance with additional aspects of this particular exemplary embodiment, the storage service groups may be configured as fail over type service groups in the event storage services are accessible to a single system in a cluster.

In accordance with additional aspects of this particular exemplary embodiment, the fail over type service groups may support a ZFS pool.

In accordance with additional aspects of this particular exemplary embodiment, the storage service groups may contain at least one of: a disk, a zpool, a mount, and a CVMVolDg resource.

In accordance with additional aspects of this particular exemplary embodiment, the network service group may contain at least one of: a NIC and a MultiNICB resource.

In accordance with additional aspects of this particular exemplary embodiment, the logical domain service group may fail over from a first system to a second system in the event that any I/O services from all I/O domains on the first system fail.

In accordance with additional aspects of this particular exemplary embodiment, the logical domain service group may fail over from a first system to a second system in the event that the control domain on the first system fails.

In accordance with additional aspects of this particular exemplary embodiment, the techniques may be realized as at least one non-transitory processor readable storage medium for storing a computer program of instructions configured to be readable by at least one processor for instructing the at least one processor to execute a computer process for performing the method.

In another particular exemplary embodiment, the techniques may be realized as an article of manufacture for monitoring guest domain configured with alternate I/O domains. The article of manufacture may comprise at least one non-transitory processor readable storage medium and instructions stored on the at least one medium. The instructions may be configured to be readable from the at least one medium by at least one processor and thereby cause the at least one processor to operate so as to install cluster services in a control domain, install cluster services in one or more alternate I/O domains, configure an alternate I/O service group to monitor services from multiple I/O domains, and configure a logical domain service group, wherein the logical domain service group manages a guest domain which receives I/O services from either the control domain or the at least one alternate I/O domain which are managed via the alternate I/O service group.

In another particular exemplary embodiment, the techniques may be realized as a system for monitoring alternate I/O domains comprising one or more processors communicatively coupled to a network, wherein the one or more processors are configured to install cluster services in a control domain, install cluster services in one or more alternate I/O domains, configure an alternate I/O service group to monitor services from multiple I/O domains, and configure a logical domain service group, wherein the logical domain service group manages a guest domain and receives I/O services from either the control domain or the at least one alternate I/O domain which are managed via the alternate I/O service group.

In accordance with additional aspects of this particular exemplary embodiment, configuring storage service groups may comprise configuring a first storage service group in the control domain and the alternate I/O domains on first system and configuring a second storage service group in the control domain the alternate I/O domains on second system.

In accordance with additional aspects of this particular exemplary embodiment, configuring network service groups may comprise configuring a first network service group in the control domain and the alternate I/O domains on first system and configuring a second network service group in the control domains and the alternate I/O domains on the second system.

In accordance with additional aspects of this particular exemplary embodiment, the storage service groups may be configured as parallel type service groups in the event storage services are simultaneously accessible to all systems in a cluster.

In accordance with additional aspects of this particular exemplary embodiment, the parallel types service groups may support at least one of: shared LUNs, shared Disks, and a Cluster Volume Manager (CVM) volume.

In accordance with additional aspects of this particular exemplary embodiment, the storage service groups are configured as fail over type service groups in the event storage services are accessible to a single system at a time in a cluster.

In accordance with additional aspects of this particular exemplary embodiment, the fail over type service groups service groups may support a ZFS Volume.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
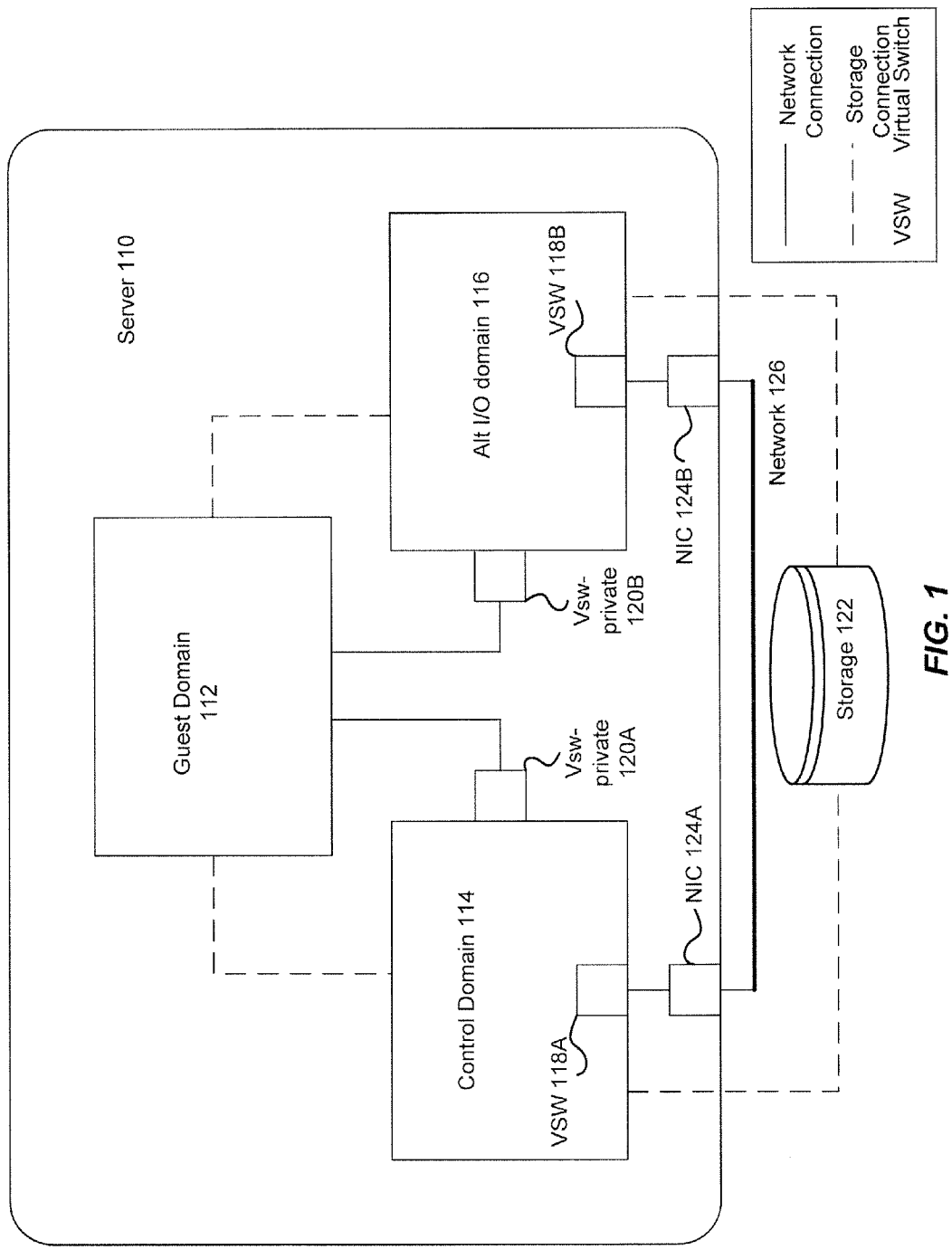
FIG. 1 shows a block diagram depicting architecture for guest domains configured with alternate I/O domains in accordance with an embodiment of the present disclosure.

FIG. 1 shows a block diagram depicting architecture for guest domain configured with alternate I/O domains in accordance with an embodiment of the present disclosure.

Virtualization technology may be highly dependent on a host system hosting the virtual hosts. Providing high availability to critical components like storage and network services to virtual guests may be important in virtual environments as these services may be single point of failures (SPOF). To protect these services, virtualization software providers may offer an alternate I/O domain technology for a virtualization platform (e.g., on UltraSPRAC™ servers for Oracle VM Server for SPARC™). With an alternate I/O domain, an administrator may provide storage and network services in highly available manner from more than one domain to virtual guests.

Virtualization technology may allow the creation of multiple virtual systems on a single physical system. Each virtual system may be called a logical domain (LDom) and may run its own copy of an operating system. Certain embodiments of virtualization technology may use different roles such as, for example, control domains, service domains, Input/Output (I/O) domains, root domains, and guest domains.

A control domain may contain a logical domain manager. The logical domain manager may allow creation and management of other logical domains, and allocation of virtual resources to other domains. According to some embodiments, there may be one control domain per server or node. A control domain may be named as a primary domain. Referring to FIG. 1, Control Domain 114 of Server 110 is an exemplary control domain.

A service domain may provide virtual device services to other domains, such as, for example, a virtual switch, a virtual console concentrator, and a virtual disk server. According to some embodiments, any domain may be configured as a service domain. Referring to FIG. 1, VSW 118A and B and Vsw-private 120A and B are exemplary virtual switches.

An I/O domain may have direct access to a physical I/O device, such as, for example, a network card in a PCI EXPRESS (PCIe) controller. An I/O domain may own (e.g., control) a PCIe root complex, or it may own a PCIe slot or on-board PCIe device by using the direct I/O (DIO) feature. For example, Control Domain 114 of FIG. 1 may own Network Interface Card (NIC) 124A and Alternate I/O Domain 116 may own NIC 124B.

A root domain may have a PCIe root complex assigned to it. A root domain may own or control the PCIe fabric and may provide one or more fabric-related services, such as fabric error handling. A root domain may also be an I/O domain, since it may own and have direct access to physical I/O devices.

A guest domain may be a non-I/O domain that consumes virtual device services that are provided by one or more service domains. According to some embodiments, a guest domain may not have any physical I/O devices, and may have only virtual I/O devices, such as virtual disks and virtual network interfaces. Referring again to FIG. 1, Guest Domain 112 may be an exemplary guest domain.

An I/O domain may have direct ownership and direct access to physical I/O devices. An I/O domain may be created by assigning a PCI EXPRESS (PCIe) bus or a PCIe endpoint device to a domain. An I/O domain can own a PCIe root complex, or it can own a PCIe slot or on-board PCIe device by using the direct I/O (DIO) feature. Because of direct access to physical I/O devices, an I/O domain may avoid the performance overhead that is associated with virtual I/O. As a result, the I/O performance on an I/O domain may more closely match the I/O performance on a bare-metal system. An I/O domain may host virtual I/O services to be used by other guest domains.

An I/O domain other than primary domain may be referred to as alternate I/O domain. Multiple I/O domains may ensure that guest domains, or nodes within a cluster, continue to operate if services from one of the I/O domain fails.

The maximum number of I/O domains creatable on the server may depend on the number of PCIe buses that are available on the server. You may also create an I/O domain by assigning a PCIe endpoint (or direct I/O-assignable) device to a domain.

Storage 122 as shown in FIG. 1 may be local, remote, or a combination thereof to server 110. Storage 122 may utilize a redundant array of inexpensive disks (RAID), striped disks, hot spare disks, tape, disk, or other computer accessible storage. In one or more embodiments Storage 122 may be a storage area network (SAN), an internet small computer systems interface (iSCSI) SAN, a Fibre Channel SAN, a common Internet File System (CIFS), network attached storage (NAS), or a network file system (NFS).

As discussed in greater detail with reference to FIG. 3 below, clustering services such as high availability clustering services (e.g., Veritas Cluster Server™ (VCS)) have not supported guest domains configured with multiple I/O domains. With an alternate I/O domain configuration, I/O services for a logical domain guest can be provided either from control domain or alternate I/O domain. Whenever there is a disruption to the I/O services from primary domain the guest domain can continue to run using the I/O services from an alternate I/O domain. Clustering services should continue monitoring a guest domain after a transition of I/O services from a control domain to an alternate I/O domain occurs without failing over the guest domain to a second node or system.

According to at least one embodiment, an exemplary agent called AlternateIO may be developed to provide consolidated status information on storage and network availability to a guest domain. An exemplary type definition of the AlternateIO agent may be:

type AlternateIO (
    static str ArgList[ ]={StorageSG, NetworkSG}
    str StorageSG{ }
    str NetworkSG{ }
)

According to this exemplary solution, clustering services may be installed in a control domain and in one or more other I/O domains. Storage and network services may be monitored from a control domain and one or more alternate I/O domains. Storage resources and network resources may be configured in separate service groups to have granular visibility. The SystemList of these service groups may be control domain and it's alternate I/O domains on the physical system. Configuring an AlternateIO agent between control domains to have a list of service groups for storage and network services as its attribute values may allow monitoring I/O services to guest domain from control domain and one or more alternate I/O domains by an Alternate I/O agent.

According to some embodiments, if the states of the storage and network service groups are ONLINE on any one of control domain or alternate I/O domains, the state of AlternateIO resource may be ONLINE. The state of AlternateIO resource may be OFFLINE if any of the storage or network service groups is OFFLINE on all the control and other I/O domains. According to some embodiments, a SystemList of a Service group containing an AlternateIO resource may contain control domains only. A StorageSG attribute of an AlternateIO resource may be a key-value pair with service groups that cater to the storage requirements of the guest domain managed by VCS as keys and may provide an option to set values to turn these service groups online or offline. The NetworkSG attribute of AlternateIO resource may be a key-value pair with service groups that cater to the network requirements of the guest domain managed by VCS as keys and may provide an option to set values to turn these service groups online or offline. The online entry point of AlternateIO agent may bring those service groups online on all the systems in the SystemList of the storage or network service groups if values for these service groups are set to 1. Similarly offline entry point of AlternateIO agent may bring the storage and network service groups offline on all the systems in their SystemList if value for these service groups are set to 1.

According to some embodiments, clustering service software may be installed in a control domain as well as in one or more alternate I/O domains. Clustering service software may also be installed in one or more guest domains.

An exemplary embodiment of a clustering configuration supporting guest domains configured with alternate I/O domains is described in reference to FIG. 3 below.

Figure 2:
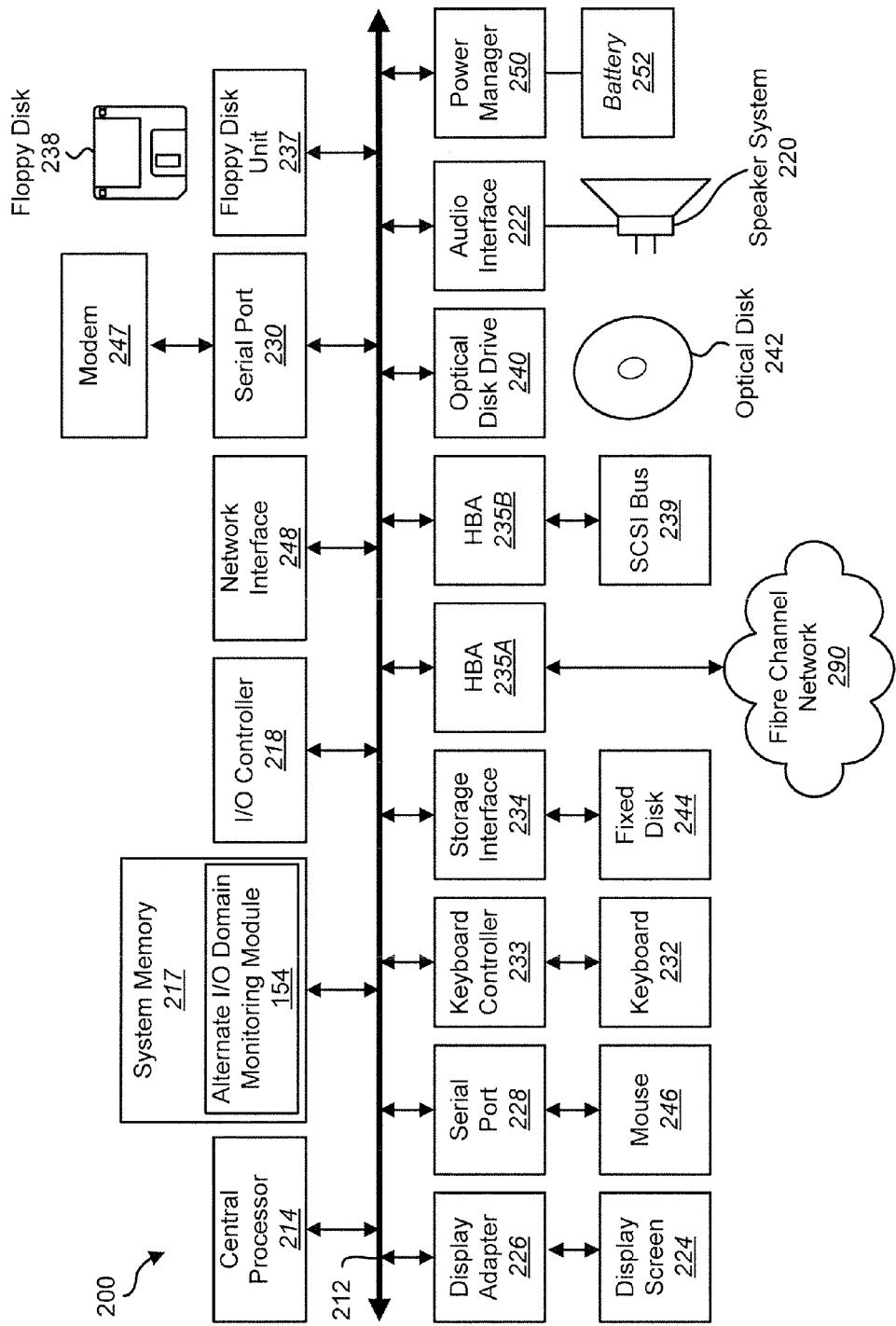
FIG. 2 depicts a block diagram of a computer system in accordance with an embodiment of the present disclosure.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM is may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, alternate I/O domain monitoring module 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
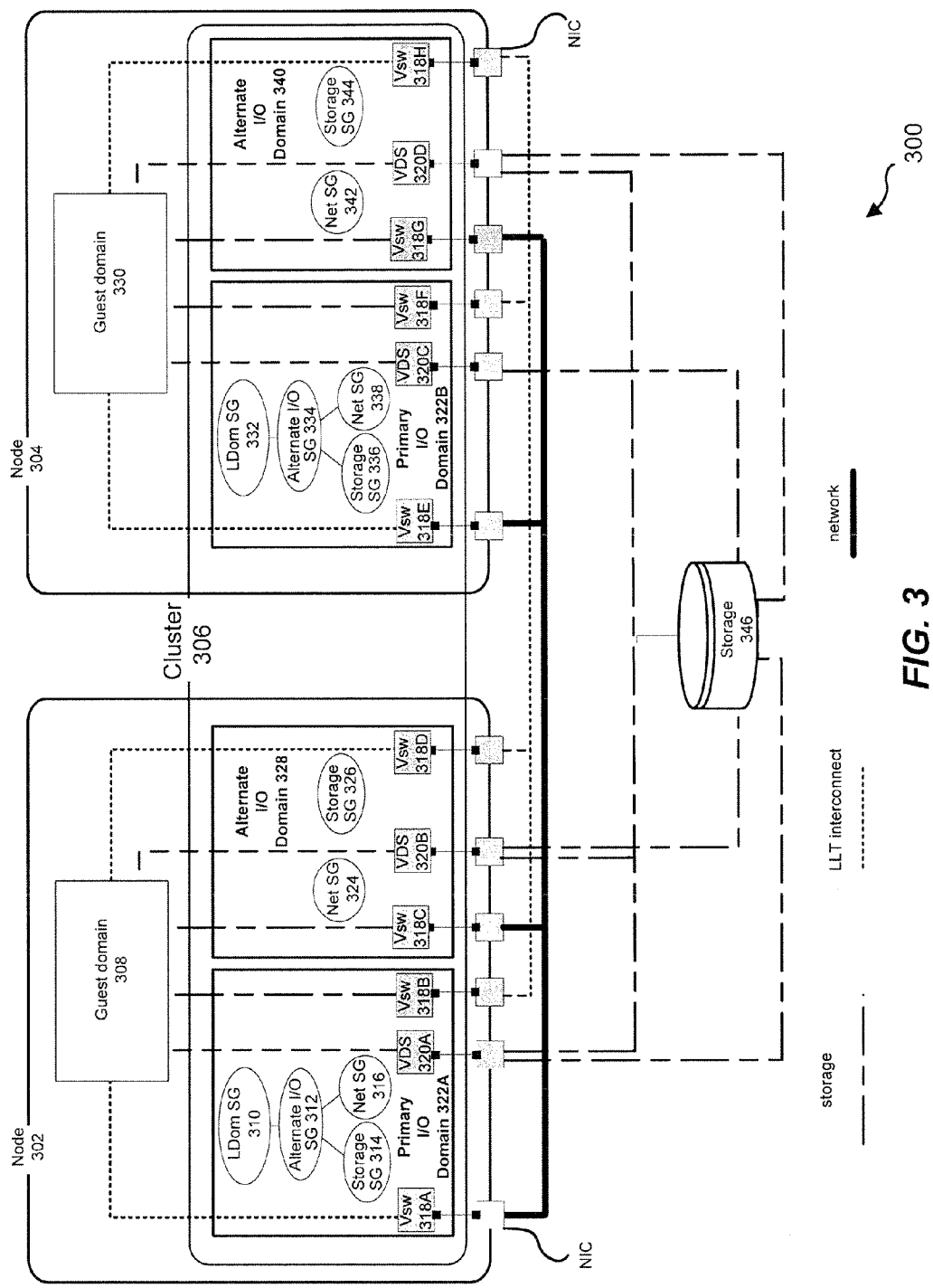
FIG. 3 shows a block diagram depicting clustering architecture for monitoring logical domains configured with alternate I/O domains in accordance with an embodiment of the present disclosure.

Referring to FIG. 3, there is shown a block diagram depicting a clustering architecture for monitoring guest domains configured with alternate I/O domains in accordance with an embodiment of the present disclosure.

As illustrated in FIG. 3, exemplary clustering embodiment 300 may contain nodes 302 and 304 and each may be implemented on separate platforms or systems. Node 302 may include multiple domains including guest domain 308, primary I/O domain 322A, and alternate I/O domain 328.

Primary I/O domain 322A may contain a logical domain service group such as LDom SG 310. Primary I/O domain 322A may also contain Alternate I/O service group 312, storage service group 314 and network service group 316. Primary I/O domain 322A may contain virtual switches VSW 318A, VSW 318B, and virtual disk service VDS 320A.

Alternate I/O domain 328 may contain network service group 324 and storage service group 326. Alternate I/O domain 328A may contain virtual switches VSW 318C, VSW 318D, and virtual disk service VDS 320B.

Virtual switches of domains may be connected by Network Interface Cards (NICs) to a network or to a cluster interconnect such as, for example, a Low Latency Transport (LLT) interconnect. Virtual Disk Services of domains may be connected to a storage connection.

Node 304 may include multiple domains including guest domain 330, primary I/O domain 322B, and alternate I/O domain 340. Primary I/O domain 322B may contain a logical domain service group such as LDom SG 332. Primary I/O domain 322B may also contain Alternate I/O service group 334, storage service group 336 and network service group 338. Primary I/O domain 322B may contain virtual switches VSW 318E, VSW 318F, and virtual disk service VDS 320C.

Alternate I/O domain 328 may contain network service group 342 and storage service group 344. Alternate I/O domain 340 may contain virtual switches VSW 318G, VSW 318H, and virtual disk service VDS 320D.

Storage 346 may be local, remote, or a combination thereof to nodes 302 and 304. Storage 346 may utilize a redundant array of inexpensive disks (RAID), striped disks, hot spare disks, tape, disk, or other computer accessible storage. In one or more embodiments, storage 346 may be a storage area network (SAN), an internet small computer systems interface (iSCSI) SAN, a Fibre Channel SAN, a common Internet File System (CIFS), network attached storage (NAS), or a network file system (NFS).

As described below, embodiments monitor the availability of storage and network I/O services for a virtual machine when virtual I/O services are made available through both the control and alternate (secondary) I/O domains. Embodiments may ensure that the applications in a guest domain run seamlessly even if there is a storage or network I/O service loss from one of the I/O domains.

Some embodiments may use Oracle VM Server for SPARC features such as 'mpgroup' to monitor storage I/O services from multiple I/O domains. If the storage connectivity is provided from both primary domain and alternate I/O domain, then appropriate "mpgroup" may be set for virtual disk service (vds). Virtual disk multi-pathing may allow a user to configure a virtual disk on a guest domain to access its back-end storage by more than one storage path. The storage paths may lead through different service domains that provide access to the same back-end storage, such as a disk Logical Unit Number (LUN). This feature may allow a virtual disk in a guest domain to remain accessible even if one of the service domains goes down.

According to some embodiments, a new agent AlternateIO, may monitor storage and network I/O services from both a control domain and one or more alternate I/O domains to provide a consolidated status of storage and network I/O services. An AlternateIO agent may check for the availability of at least one I/O path either from control domain or from one or more alternate I/O domains.

According to some embodiments, to facilitate AlternateIO agent access to the status of the I/O services, clustering software may be installed in control domain and in one or more I/O domains and the storage and network I/O services may be configured in a parallel service group between the control domain and one or more alternate I/O domains. The storage and network I/O services may be configured in separate service groups if granular control is desired. The storage service group may contain clustering resources to monitor underlying storage devices such as LUN, ZFS pool, or Cluster Volume Manager (CVM) volume, and other storage resources.

The network service group may contain clustering resources to monitor the underlying network devices such as NIC, and other network resources.

AlternateIO agent resource may be configured in a separate service group. An AlternateIO service group may be configured as a fail over or parallel service group, which may be based on the type of underlying storage devices. The attributes of AlternateIO, storage and network resources may be localized based on a configuration. The LDom resource may be configured as a fail over resource between control domains in a separate service group and may will have a group dependency (online local hard) with service group of AlternateIO resource.

To configure clustering software (e.g., Veritas Cluster Server) to manage a guest domain having I/O services exported from multiple I/O domains, the clustering software may be installed on a control domain as well as one or more alternate I/O domains. Considering an example based on FIG. 3, where clustering software manages a guest domain (e.g., guest domain 308) using LDom agent (e.g., LDOM SG 310) as failover resource between two physical systems (e.g., Nodes 302 and 304) and the guest domain has I/O services exported from control or primary I/O domain 322A and alternate I/O domain 328. In this scenario, clustering software may be configured as a four node cluster consisting of primary I/O domain 322A (the control domain) and alternate I/O domain 328 on first physical node (node 302) and primary I/O domain 322B and alternate I/O domain 340 on the second physical node (node 304).

Virtual disk multipathing may be configured in the control domains. If a back end storage device exported to a guest domain as virtual disk is having paths available through primary domain and alternate I/O domain, virtual disk multipathing may be enabled. Enabling this feature may ensure that disks in the guest domain remain accessible even if services from one I/O domain goes down or even one service domain goes down. In other words, when the guest domain accesses the virtual disk, the virtual disk driver goes through one of the service domains to access the back-end storage. If the virtual disk driver cannot connect to one service domain, the virtual disk attempts to reach the back-end storage through a other service domain. To enable virtual disk multipathing, the virtual disk back end may be exported from each service domain and the virtual disk may be added to the same multipathing group (mpgroup). The mpgroup may be identified by a name and may be configured when you export the virtual disk back end. According to an exemplary embodiment, virtual disk multipathing may be configured by:

exporting the virtual disk back end from the primary service domain;

\# ldm add-vdsdev mpgroup=data backend-path1 volume@primary-vds0 where backend-path1 may be the path to the virtual disk back end from the primary domain;

exporting the same virtual disk back end from the alternate service domain;

\#ldm add-vdsdev mpgroup=data backend-path2 volume@alternate-vds0 where backend-path2 may be the path to the virtual disk back end from the alternate domain.

Export the virtual disk to the guest domain; and

\# ldm add-vdisk disk-name volume@primary-vds0 ldg Configuration of clustering agents for storage and network services may be exported to guest domain.

Exemplary back end storage device that can be exported to guest domain may include: a LUN, Disk, CVM volume, a flat file on a file system, zpool. The storage resources exported to the guest logical domain can be managed by storage agents like Disk, Zpool, DiskGroup, Volume, Mount, CVMVolDG, etc. The resources may be localized to give different attribute values specific to nodes. The storage resources may be configured in a parallel service group between a control domain and an alternate I/O domain in a physical node. A parallel service group may be configured when a storage resource can be online on a control domain as well as on an alternate I/O domain. Such service groups may be configured on each physical node and may have a control domain and an alternate I/O domain in their SystemList. Disk reservation may be used when configuring a DiskGroup shared between multiple physical nodes that can be simultaneously imported on multiple nodes.

Network resources may be exported to a guest logical domain and managed with agents such as, for example, NIC or MultiNICB. The resources may be localized to provide different attribute values specific to nodes. Network resources may be configured in a parallel service group between control domain and alternate I/O domain in a physical node when a network resource can be online on a control domain as well as alternate I/O domain. Such service groups may be configured on each physical node and may have a control domain and an alternate I/O domain in their SystemList.

An AlternateIO resource may be configured on a separate service group as a fail over service group. The SystemList of a service group may be containing only the control domains. The StorageSG attribute of the AlternateIO resource may be storage service groups configured to manage storage resources exported to guest domain. A StorageSG attribute may be localized to give storage service group names specific to physical nodes. A NetworkSG attribute of the AlternateIO resource may be network service groups configured to manage network resources exported to a guest domain. A NetworkSG attribute may be localized to provide network service group names specific to physical nodes.

A guest domain may be managed by a LDom resource and may be configured in a separate service group as a fail over service group with SystemList containing only the control domains on the nodes. An LDom service group may have service group dependency (online local hard) with an AlternateIO service group.

| Failover scenarios | | | |
| --- | --- | --- | --- |
| Scenario | On control domain | On alternate I/O domain | VCS behavior |
| State of each storage service group configured in the StorageSG attribute of Alternate IO resource | Online | Online | No fail over |
| | Offline/Fault | Online | No fail over |
| | Online | Offline/Fault | No fail over |
| | Offline/Fault | Offline/Fault | Fail over |
| State of each of the network service group configured on NetworkSG attribute of AlternateIO resource | Online | Online | No fail over |
| | Offline/Fault | Online | No fail over |
| | Online | Offline/Fault | No fail over |
| | Offline/Fault | Offline/Fault | Fail over |
| Node state | Up | up | No fail over |
| | Up | down | No fail over |
| | down | up | Fail over |
| | down | down | Fail over |

AlternateIO agent may monitor storage and network service groups when a guest domain is managed by clustering services with multiple I/O domains configured to provide storage and network I/O services redundancy to guest domains. AlternateIO agent may provide consolidated status of storage and network connectivity from multiple I/O domains.

The state of AlternateIO resource may indirectly depend upon the state of storage and/or network resources that are part of the service groups it is monitoring.

Exemplary Agent functions may include:

Online: May online the storage and network service groups if value of the key value pair type attribute StorageSG is set to 1 else do nothing.

Offline: May offline the storage and network service groups if value of the key value pair type attribute StorageSG is set to 1 else do nothing.

Monitor: May monitor the state of storage and network service groups. The resource may show online if each storage service group and each network service group is online on one of the primary or alternate I/O domains or both. The resource may show offline if any of the storage service groups or any of the network service groups is not online on both the primary and alternate I/O domains.

An exemplary resource type definition for an AlternateIO agent is provided below:

```
type AlternateIO (
    static str ArgList[ ]={StorageSG, NetworkSG}
    str StorageSG{ }
    str NetworkSG{ }
)
```

Sample Configurations

A main.cf example that shows the AlternateIO resource configuration is given below:

```
include "types.cf"
cluster altio-cluster (
UserNames = { admin = XXXXXXXXXXX }
Administrators = { admin }
HacliUserLevel = COMMANDROOT
)
system primary1 (
)
system alternate1 (
)
system primary2 (
)
system alternate2 (
)
group aiosg (
    SystemList = { primary1 = 0, primary2 = 1 }
    AutoStartList = { primary1 }
    TriggerPath = "bin/AlternateIO"
    TriggersEnabled @primary1 = { PREONLINE }
    TriggersEnabled @primary2 = { PREONLINE }
    )
    AlternateIO altiores (
        StorageSG @primary1 = { primary1-strsg = 1 }
        StorageSG @primary2 = { primary2-strsg = 1 }
        NetworkSG @primary1 = { primary1-nwsg = 0 }
        NetworkSG @primary2 = { primary2-nwsg = 0 }
    )
    // resource dependency tree
    //
    // group aiosg
    // {
    // AlternateIO altiores
    // }
group ldomsg (
    SystemList = { primary1 = 0, primary2 = 1 }
    AutoStartList = { primary1 }
    )
    LDom ldmguest (
        LDomName = ldg1
    )
    requires group aiosg online local hard
    // resource dependency tree
    //
    // group ldomsg
    // {
    // LDom ldg1
```

-continued

```
// }
group primary1-strsg (
    SystemList = { primary1 = 0, alternate1 = 1 }
    AutoStart = 0
    Parallel = 1
    TriggerPath = "bin/AlternateIO/StorageSG"
    TriggersEnabled @primary1 = { PREONLINE }
    TriggersEnabled @alternate1 = { PREONLINE }
    AutoStartList = { primary1, alternate1 }
    )
    Zpool zpres1 (
        PoolName @primary1= zfsprim
        PoolName @alternate1 = zfsmirr
        ForceOpt = 0
    )
    // resource dependency tree
    //
    // group primary1-strsg
    // {
    // Zpool zpres1
    // }
group primary1-nwsg (
    SystemList = { primary1 = 0, alternate1 = 1 }
    Parallel = 1
    )
    Phantom ph1 (
    )
    NIC nicres1 (
        Device @primary1 = nxge3
        Device @alternate1 = nxge4
    )
    // resource dependency tree
    //
    // group primary1-nwsg
    // {
    // Phantom ph1
    // Proxy nicres1
    // }
group primary2-strsg (
    SystemList = { primary2 = 0, alternate2 = 1 }
    Parallel = 1
    TriggerPath = "bin/AlternateIO/StorageSG"
    TriggersEnabled @primary2 = { PREONLINE }
    TriggersEnabled @alternate2 = { PREONLINE }
    )
    Zpool zpres2 (
        PoolName @ primary2 = zfsprim
        PoolName @ alternate2 = zfsmirr
        ForceOpt = 0
    )
    // resource dependency tree
    //
    // group primary2-strsg
    // {
    // Zpool zpres2
    // }
group primary2-nwsg (
    SystemList = { primary2 = 0, alternate2 = 1 }
    Parallel = 1
    )
    Phantom ph2 (
    )
    NIC nicres2 (
        Device @primary2 = nxge3
        Device @alternate2 = nxge4
    )
    // resource dependency tree
    //
    // group primary2-nwsg
    // {
    // Phantom ph2
    // Proxy nicres2
    // }
```

Figure 4:
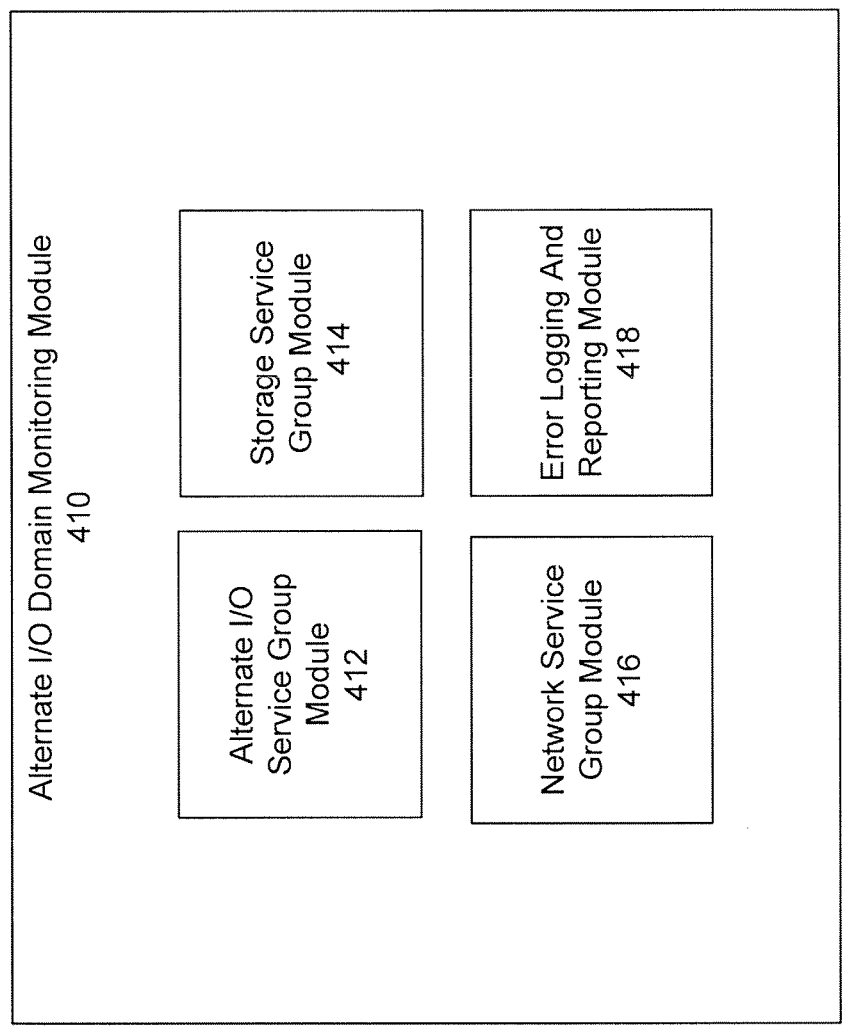
FIG. 4 shows a module for monitoring logical domains configured with alternate I/O domains in accordance with an embodiment of the present disclosure.

Referring to FIG. 4, there is shown an alternate I/O domain monitoring module 410 in accordance with an embodiment of the present disclosure. As illustrated, the alternate I/O domain monitoring module 410 may contain one or more components including alternate I/O service group module 412, storage service group module 414, network service group module 416, and error logging and reporting module 418.

The description below describes network elements, computers, and/or components of a system and method for monitoring guest domain configured with alternate I/O domains that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Alternate I/O service group module 412 may monitor storage and network I/O services from both a control domain and one or more alternate I/O domains to provide a consolidated status of storage and network I/O services. Alternate I/O service group module 412 may check for the availability of at least one I/O path either from control domain or from one or more alternate I/O domains. Alternate I/O service group module 412 may monitor storage and network service groups when a guest domain is managed by clustering services with multiple I/O domains configured to provide storage and network I/O services redundancy to guest domains. Alternate I/O service group module 412 may provide consolidated status of storage and network connectivity from multiple I/O domains.

Storage service group module 414 may monitor the status of storage services to a logical domain and may provide status information to Alternate I/O service group module 412.

Network service group module 416 may monitor the status of network services to a logical domain and may provide status information to Alternate I/O service group module 412.

Error logging and reporting module 418 may produce logs, reports, or other information associated with monitoring guest domains configured with alternate I/O domains.

Figure 5:
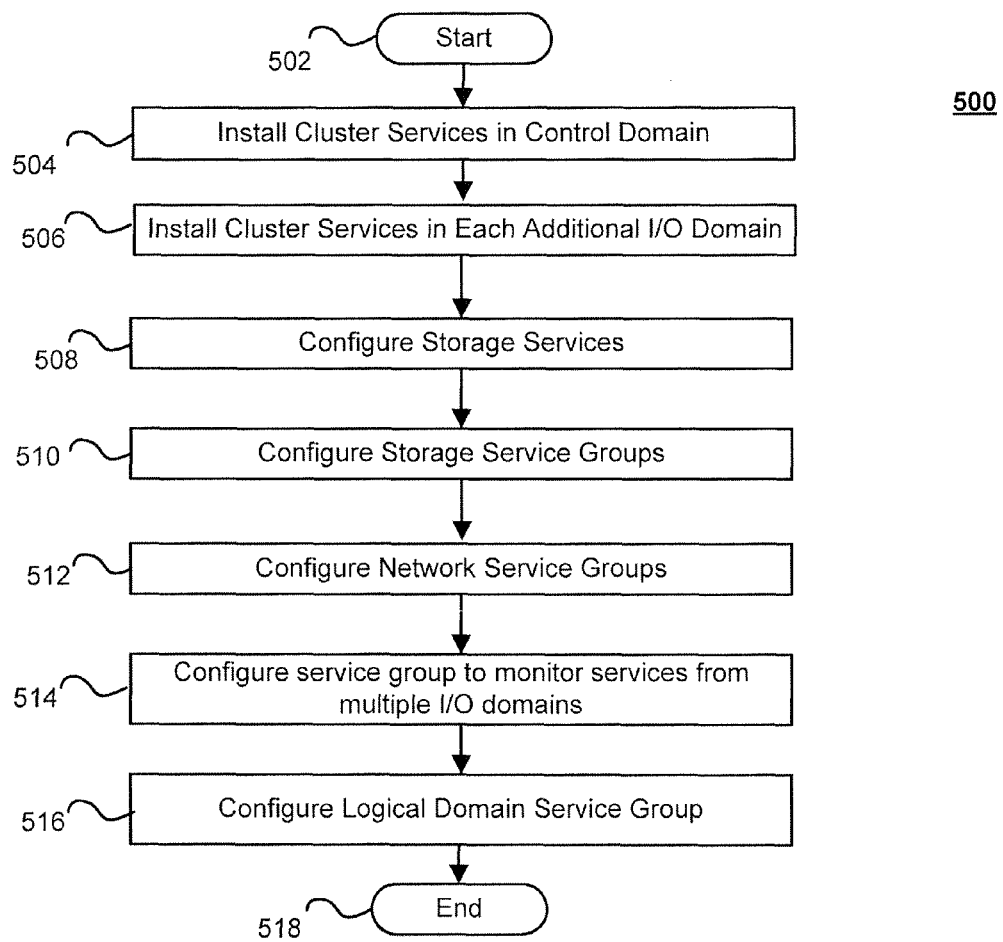
FIG. 5 depicts a method for monitoring guest domains configured with alternate I/O domains in accordance with an embodiment of the present disclosure.

Referring to FIG. 5, there is depicted a method 500 for monitoring guest domains configured with alternate I/O domains in accordance with an embodiment of the present disclosure. At block 502, the method 500 may begin.

At block 504, cluster services may be installed in a control domain.

At block 506, cluster services may be installed in each additional I/O domain (e.g., one or more alternate I/O domains).

At block 508, storage services may be configured. For example, back end storage device may be exported to guest logical domain (e.g., exported backend storage may include: a LUN, Disk, a flat file on a file system, zpool or CVM volume). The storage resources exported to the guest logical domain can be managed by storage agents such as, for example, Disk, Zpool, Mount, CVMVolDG etc.

At block 510, storage service groups may be configured. Storage service groups may be configured for each physical node. Having a storage service group configured for each node may prevent failover to a second node if a first node has an online I/O domain with storage services.

At block 512, network service groups may be configured. Network service groups may be configured for each physical node. Having a network service group configured for each node may prevent failover to a second node if a first node has an online I/O domain with network services.

At block 514, a service group such as, for example, an alternate I/O service group may be configured to monitor I/O services from multiple I/O domains. A consolidated status of the multiple I/O domains may be provided to a logical domain service group.

At block 516, a logical domain service group may be configured. The logical domain service group may use a status from an alternate I/O service group to monitor available I/O services and to determine whether a failover is necessary.

At block 518, the method 500 may end.

At this point it should be noted that monitoring guest domain configured with alternate I/O domains in accordance with the present disclosure as described above typically involves the processing of input data and the generation of output data to some extent. This input data processing and output data generation may be implemented in hardware or software. For example, specific electronic components may be employed in an alternate I/O domain monitoring module or similar or related circuitry for implementing the functions associated with monitoring guest domains configured with alternate I/O domains in accordance with the present disclosure as described above. Alternatively, one or more processors operating in accordance with instructions may implement the functions associated with monitoring guest domains configured with alternate I/O domains in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for monitoring guest domains configured with alternate Input/Output (I/O) domains to improve I/O services monitoring, each domain comprising a logical domain of a virtualization platform, the method comprising:
    installing cluster services in a control domain of the virtualization platform;
    installing cluster services in at least one alternate I/O domain of the alternate I/O domains;
    configuring storage service groups of the virtualization platform, wherein the storage service groups contain at least one of: a disk, a zpool, a mount, and a CVMVolDg resource;

configuring, using at least one computer processor, an alternate service group to monitor services from multiple I/O domains of the virtualization platform;

configuring a logical domain service group of the virtualization platform, wherein the logical domain service group manages a guest domain which receives I/O services from either the control domain or the at least one alternate I/O domain which are monitored via the alternate I/O service group; and determining, using the logical domain service group, whether failover is necessary.

2. The method of claim 1, wherein configuring storage service groups comprises configuring a first storage service group in the control domain and the at least one alternate I/O domain on a first system and configuring a second storage service group in the control domain and the at least one alternate I/O domain on a second system.

3. The method of claim 1, further comprising configuring network service groups, wherein configuring network service groups comprises configuring a first network service group in the control domain and the at least one alternate I/O domain on first system and a second network service group in the control domain and the at least one alternate I/O domain on second system.

4. The method of claim 3, wherein at least one of the network service groups contains at least one of: a NIC and a MultiNICB resource.

5. The method of claim 1, wherein the storage service groups are configured as parallel type service groups when storage services are simultaneously accessible to all nodes in a cluster.

6. The method of claim 5, wherein the parallel types service groups support at least one of: shared Logical Unit Numbers (LUNs), shared disks, and a Cluster Volume Manager (CVM) volume.

7. The method of claim 1, wherein the storage service groups are configured as fail over type service groups in the event storage services are accessible to a single system in a cluster.

8. The method of claim 7, wherein the fail over type service groups support a ZFS pool.

9. The method of claim 1, wherein the logical domain service group fails over from a first system to a second system in the event that all I/O services from all I/O domains on the first system fail.

10. The method of claim 1, wherein the logical domain service group fails over from a first system to a second system in the event that the control domain on the first system fails.

11. At least one non-transitory processor readable storage medium for storing a computer program of instructions configured to be readable by at least one processor for instructing the at least one processor to execute a computer process for performing the method as recited in claim 1.

12. An article of manufacture for monitoring guest domain configured with alternate Input/Output (I/O) domains to improve I/O services monitoring, each domain comprising a logical domain of a virtualization platform, the article of manufacture comprising:

at least one non-transitory processor readable storage medium; and instructions stored on the at least one medium;

wherein the instructions are configured to be readable from the at least one medium by at least one processor and thereby cause the at least one processor to operate so as to:

install cluster services in a control domain of the virtualization platform;

install cluster services in at least one alternate I/O domain of the alternate I/O domains;

configure storage service groups of the virtualization platform, wherein the storage service groups contain at least one of: a disk, a zpool, a mount, and a CVM-VolDg resource;

configure an alternate I/O service group to monitor services from multiple I/O domains of the virtualization platform;

configure a logical domain service group of the virtualization platform, wherein the logical domain service group manages a guest domain which receives I/O services from either the control domain or the at least one alternate I/O domain which are managed via the alternate I/O service group; and determine, using the logical domain service group, whether failover is necessary.

13. A system for monitoring alternate Input/Output (I/O) domains to improve I/O services monitoring, each domain comprising a logical domain of a virtualization platform, the system comprising:

one or more processors communicatively coupled to a network; wherein the one or more processors are configured to:

install cluster services in a control domain of the virtualization platform;

install cluster services in at least one alternate I/O domain of the alternate I/O domains;

configure storage service groups of the virtualization platform, wherein the storage service groups contain at least one of: a disk, a zpool, a mount, and a CVM-VolDg resource;

configure an alternate I/O service group to monitor services from multiple I/O domains of the virtualization platform;

configure a logical domain service group of the virtualization platform, wherein the logical domain service group manages a guest domain and receives I/O services from either the control domain or the at least one alternate I/O domain which are managed via the alternate I/O service group; and determine, using the logical domain service group, whether failover is necessary.

14. The system of claim 13, wherein configuring storage service groups comprises configuring a first storage service group in the control domain and the at least one alternate I/O domain on first system and configuring a second storage service group in the control domain the at least one alternate I/O domain on second system.

15. The system of claim 13, further comprising configuring network service groups, wherein configuring network service groups comprises configuring a first network service group in the control domain and the at least one alternate I/O domain on first system and configuring a second network service group in the control domains and the at least one alternate I/O domain on the second system.

16. The system of claim 13, wherein the storage service groups are configured as parallel type service groups when storage services are simultaneously accessible to all systems in a cluster.

17. The system of claim 16, wherein the parallel type service groups support at least one of: shared Logical Unit Numbers (LUNs), shared disks, and a Cluster Volume Manager (CVM) volume.

18. The system of claim 13, wherein the storage service groups are configured as fail over type service groups in the event storage services are accessible to a single system in a cluster.

19. The system of claim 13, wherein the fail over type service groups service groups support a ZFS Volume.

* * * * *